July 15, 1941.   E. T. CROASDALE   2,249,458
ELECTRICAL INSULATION
Filed Jan. 5, 1938
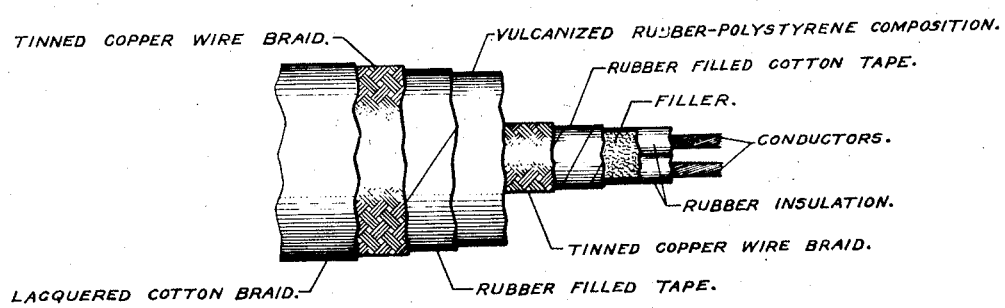
Inventor:
Evan T. Croasdale,
by Harry E. Dunham
His Attorney.

Patented July 15, 1941

2,249,458

UNITED STATES PATENT OFFICE 2,249,458

ELECTRICAL INSULATION

Evan T. Croasdale, Bridgeport, Conn., assignor to General Electric Company, a corporation of New York Application January 5, 1938, Serial No. 183,474

4 Claims. (Cl. 174—125)

The present invention relates to electrical insulation and particularly to electrical insulation suitable for conductors which necessitate insulation exhibiting low power factor and low specific inductive capacity at normal and radio frequencies.

In accordance with the present invention the electrical insulation is prepared by compounding rubber, preferably deproteinized rubber, with polystyrene within definite limits of proportions of said ingredients in order to obtain a product which is capable of being vulcanized to a permanently flexible and resilient state.

It has heretofore been proposed to make electrical insulation from rubber and liquid styrene but such proposals, as far as I am aware, have been based on the use of a large amount of the styrene with the rubber, yielding thermoplastic products which stiffen and become brittle at low temperatures, and soften with a tendency to flow at high temperatures. Moreover, it has been necessary to incorporate waxes with the ingredients of the insulation to assist in keeping them thermoplastic. It has also been proposed to effect a polymerization of the styrene from the monomeric liquid state into the polymerized state in the presence of the rubber after mixing the ingredients.

I have found that it is unnecessary to use wax and that the percentage of styrene in the insulation can be reduced materially by employing the polymerized styrene instead of the monomeric liquid unpolymerized styrene. In doing so the expensive ingredient of the mixture is reduced, and at the same time, provided certain definite proportions are employed, the insulation retains its rubber-like characteristics and flexibility even after heating. Moreover, even with the low amount of polystyrene the insulation exhibits unusually low power factor and low specific inductive capacity at both normal and radio frequencies.

In order that the invention may be more readily understood the following example of the preparation of electrical insulation in accordance therewith is given:

Rubber, either standard plantation grade or purified (deproteinized) and polystyrene are mixed at the softening temperature of the polystyrene on regular type rubber mills. Vulcanizing ingredients such as accelerators, e. g. mercaptobenzothiazole, diorthotolylguanidine, etc., fillers, e. g. zinc oxide, clay, etc., vulcanizing agents, e. g. sulfur, etc., may be added to the mix in order to vulcanize the rubber. The mixture of rubber and polystyrene may be varied in accordance with the physical and electrical characteristics desired in the insulation, but the percentage of polystyrene in the mixture must be less than 40% by weight of the rubber in the total rubber-polystyrene mix in order to obtain permanent flexibility and rubber-like characteristics under changes in temperature.

One specific example of a mixture giving extremely low power factor and specific inductive capacity at normal and radio frequencies is:

| | Parts by weight |
|---|---|
| Rubber | 75 |
| Polystyrene | 25 |
| Zinc oxide | 0.75 |
| Zinc laurate | 0.75 |
| Tetramethylthiuramdisulfide | 2.6 | the ingredients being compounded on regular rubber compounding rolls as described above.

This composition after vulcanizing shows on test at 1000 cycles at room temperature a power factor after 24 hours immersion in water of 0.0024 which drops after 100 days immersion to less than 0.002. The specific inductive capacity under the same conditions increases less than 3% (2.52 to 2.62). Tested at radio frequencies (dry) this compound has a power factor at 500 kc. of 0.004 and at 6 mc. of 0.007.

Another example of the invention is the production of an X-ray cable utilizing a protective sheath of the rubber-polystyrene mix. The rubber-polystyrene compound may be made as follows:

Equal parts by weight of deproteinized rubber of polystyrene are mixed together on a standard rubber mill at 300° F. This master batch is then mixed into the following formula:

| | Parts by weight |
|---|---|
| Polystyrene-rubber master batch | 50 |
| Deproteinized rubber | 50 |
| Zinc oxide | 0.75 |
| Laurex | 0.75 |
| Stearic acid | 0.75 |
| Captax (mercaptobenzothiazole) | 1.25 |
| Dotg (diorthotolylguanidine) | 1.25 |
| Sulphur | 1.25 |

This composition after vulcanization shows on test on #14 AWG wire: 3/64 wall thickness, a power factor at normal frequency of 0.0085 which drops after 28 days immersion in water to 0.0049. The insulation value in megohms/1000 feet improves from 661 to 2367 or 260% from 24-hr. immersion in water to 28 days immersion.

The actual construction of the X-ray cable is as follows:

Inner conductors of #14 AWG tinned copper are insulated with $\frac{1}{32}$ inch wall of stranded vulcanized 30% rubber compound, twisted together with a jute filler to make round and wrapped with a rubber filled cotton tape. This is braided with a tinned copper wire braid and strip covered with the 25% polymerized styrene, 75% rubber compound (as prepared above) approximately $\frac{20}{64}$ inch thick to a diameter of 0.94 to 0.96". This is then wrapped with rubber filled tape and vulcanized in a lead sheath on a drum in a standard open steam vulcanizer with a 15 minute rise to 282° F. and held 40 minutes at 282° F. The lead sheath is removed and a braid of tinned copper wire is put on followed by a cotton braid which is then lacquered.

The accompanying drawing shows diagrammatically the construction of the above cable.

What I claim as new and desire to secure by Letters Patent of the United States is:

1. A flexible, rubber-like, electrical insulation exhibiting low power factor and low specific inductive capacity at normal and radio frequencies comprising essentially a wax-free vulcanized mixture of rubber and polystyrene, the polystyrene comprising not over 40 per cent by weight of the rubber in the mixture.

2. An electrical cable comprising a flexible insulating layer exhibiting low power factor and low specific inductive capacity at normal and radio frequencies comprising a wax-free vulcanized mixture of rubber and polystyrene, the polystyrene comprising not over 40 per cent by weight of the rubber in the mixture.

3. An electrical cable comprising a flexible, rubber-like, insulating layer exhibiting low power factor and low specific inductive capacity at normal and radio frequencies comprising a wax-free vulcanized mixture of 75 per cent by weight deproteinized rubber and 25 per cent by weight polystyrene.

4. A flexible, rubber-like, electrical insulation exhibiting low power factor and low specific inductive capacity at normal and radio frequencies comprising a wax-free vulcanized mixture containing as its essential ingredients deproteinized rubber and polystyrene, the polystyrene content being less than 40 per cent by weight of the rubber in the mixture.

EVAN T. CROASDALE.